Dec. 17, 1957     N. L. HANSON     2,816,797
VEHICLE BODY STRUCTURE

Filed Nov. 8, 1954     4 Sheets-Sheet 1

INVENTOR
*Nels L. Hanson*
BY *Burns, Doane, Benedict & Swane*
ATTORNEYS

Dec. 17, 1957     N. L. HANSON     2,816,797
VEHICLE BODY STRUCTURE
Filed Nov. 8, 1954     4 Sheets-Sheet 3

INVENTOR
*Nels L. Hanson*
BY *Burns, Doane Benedict & Irons*
ATTORNEYS

Dec. 17, 1957 N. L. HANSON 2,816,797
VEHICLE BODY STRUCTURE
Filed Nov. 8, 1954 4 Sheets-Sheet 4

INVENTOR
*Nels L. Hanson*
BY *Burns Doane Benedict & Isons*
ATTORNEYS

United States Patent Office 2,816,797
Patented Dec. 17, 1957

2,816,797

VEHICLE BODY STRUCTURE

Nels L. Hanson, Park River, N. Dak.

Application November 8, 1954, Serial No. 467,480

8 Claims. (Cl. 298—28)

This invention relates generally to a vehicle body structure. More particularly, the invention is directed to a material carrying vehicle body having a bottom dispensing opening provided with a closure consisting of a series of overlying longitudinally movable plates.

There are presently available a variety of wagon or truck body constructions generally employed in form harvesting operations and in the transportation of various farm products from the farm to the processing plant or a produce collecting depot. It is desired that structures for such use not only be suitable for quick loading but also that such structures include means to facilitate rapid unloading of the vehicle at its final destination. These material carrying vehicles must have a construction which will insure that the material being hauled does not seep or run out of the material receptacle under the vibration and jarring created in movement of the vehicle over rough uneven country roads. Particularly in the case of transporting grain is this seepage problem acute. Also with such a load of particulate material, the closure for any dispensing opening from the material receptacle must provide an efficient seal against seepage.

Although not limited thereto, the instant invention has been developed in response to the particular need of farmers for a wagon or truck body to be used in the hauling of grain, potatoes, sugar beets, etc. In the haulage of such products the material receptacle must be rugged in construction to withstand long and hard usage and any closure for a dispensing opening from the receptacle must, above all, be of a construction which is not subject to clogging or jamming to impair the free and easy opening and closing of the dispensing opening.

Accordingly, it is a primary object of the instant invention to provide a bottom dispensing vehicle body having an improved closure and closure mounting for the dispensing opening so constructed and arranged as to preclude clogging and/or non-free opening and closing of the dispensing opening.

It is a further object of this invention to provide a material carrying vehicle body having a bottom dispensing opening with a series of overlapping longitudinally slideable closure plates mounted on and guided by a pair of rails having upstanding edges engaging guide means on the plates to insure against clogging of their supporting and guiding function in the operation of the closure.

It is also an object of this invention to provide a material carrying vehicle body with a closure consisting of a series of overlapping plates movable longitudinally of the dispensing opening to substantially completely overlie one another in the fully opened position and having means overlying the edges of the closure to alleviate seepage of material laterally from the sides of such closure.

It is an additional object of the instant invention to provide a material carrying vehicle body with a closure consisting of a series of overlapping plates movable longitudinally of the dispensing opening to completely overlie one another in the fully open position wherein the forward end of the plates is curved downwardly to snugly engage the upper surface of the next preceeding plate and thereby effectively clean the preceding plate upon movement of the plates to open the dispensing opening.

With the foregoing and other objects in view, which will appear more clearly as the description proceeds, the invention resides in the combination and arrangement of parts and in the details of construction hereinafter described and claimed, it being understood that changes in the precise embodiment of the invention herein disclosed may be made within the scope of the appended claims without departing from the spirit of the invention.

Referring to the drawings:

Fig. 6 is a fragmentary view on a somewhat enlarged scale taken on line 6—6 of Fig. 3 as indicated by the arrows.

Figure 1:
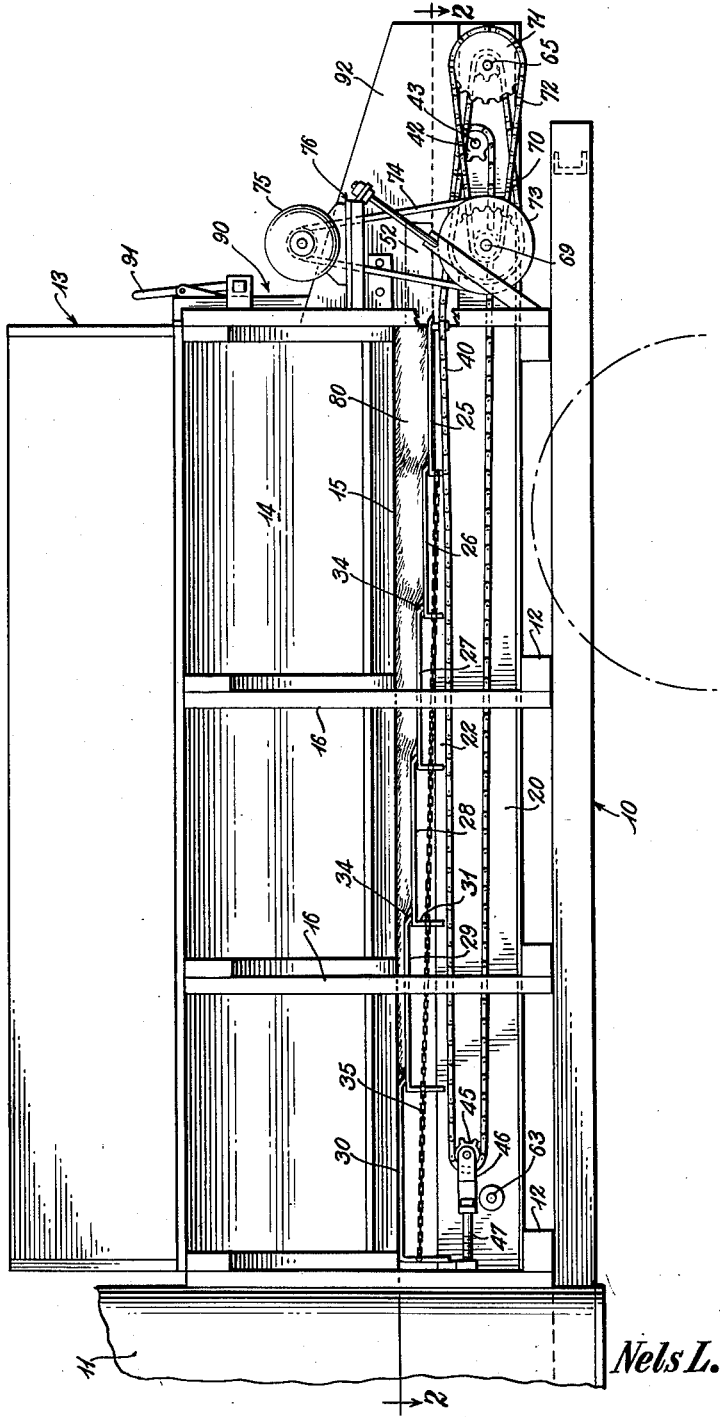
Figure 1 is a side elevational view of the material carrying vehicle body of the instant invention shown mounted on a truck frame.
Figure 2:
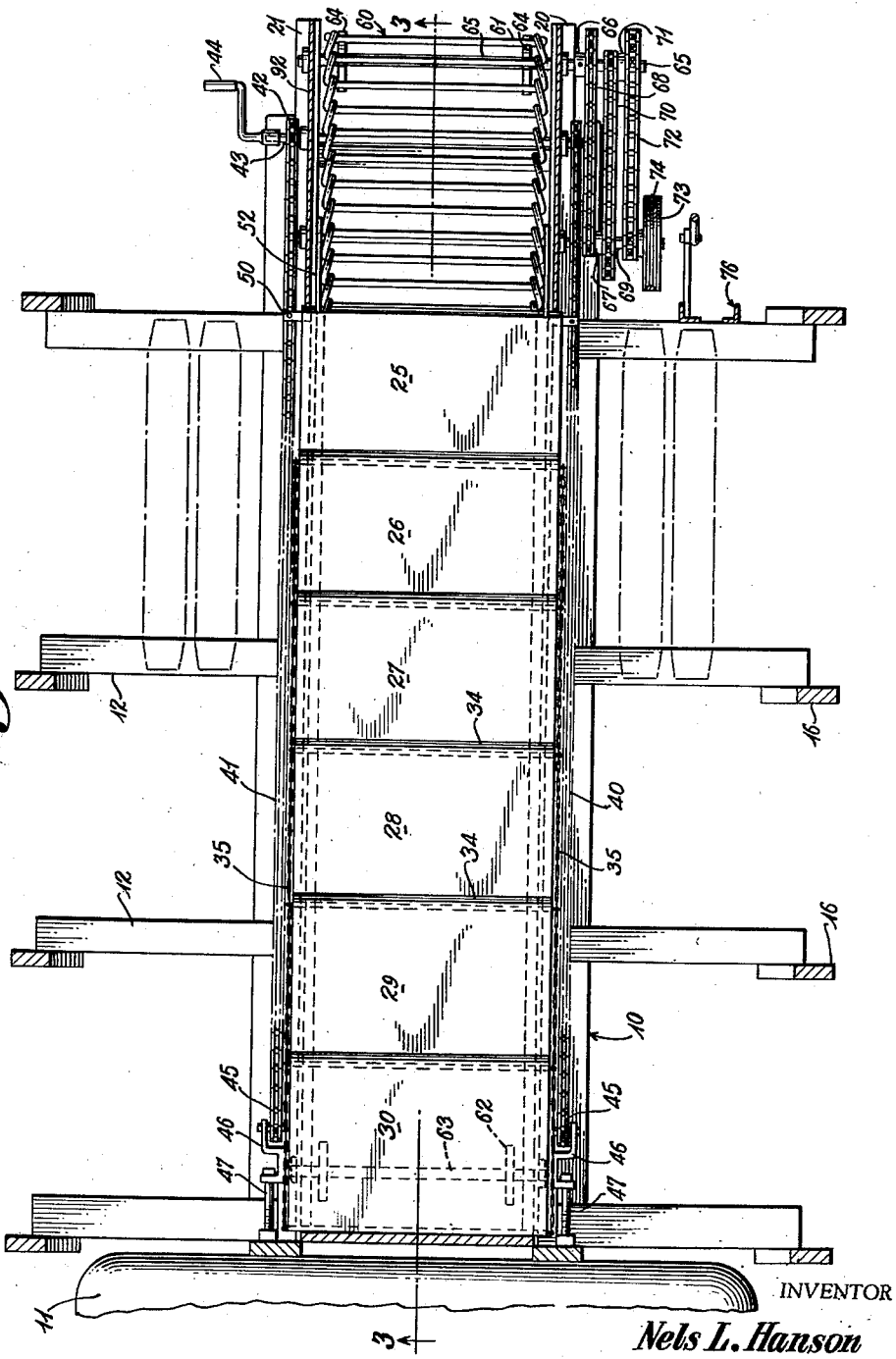
Figure 2 is a horizontal sectional view taken on line 2—2 of Figure 1.

Referring more specifically to Figure 1 of the drawings, the material carrying body of the instant invention is shown thereon mounted on a suitable truck frame 10 rearwardly of a truck cab 11. A series of transverse beams 12 extend across the frame 10 and are secured thereto to provide a base for the material carrying body. A material receptacle 13 having a hopper bottom 14 terminating in a central longitudinal dispensing opening 15 is supported on the transverse beams 12 with a series of upright supports 16 connected between the outer ends of beams 12 and the junction of the hopper bottom 14 with the straight upper sides of the receptacle to securely mount the receptacle on the beams 12.

Figure 4:
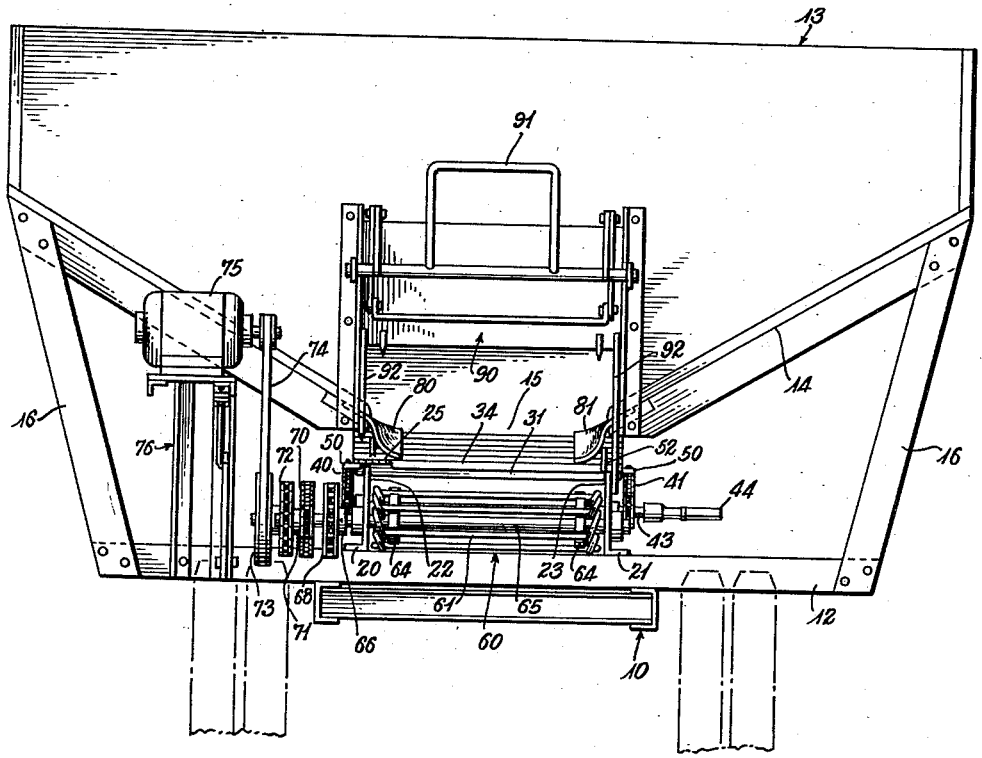
Figure 4 is an end elevational view of the vehicle body of Figure 1.

As shown more clearly in Figure 4, a pair of spaced parallel rails 20 and 21 are secured longitudinally of the receptacle 13 disposed beneath the side edges of the dispensing opening 15. These rails illustrated in the instant embodiment as having an angle cross-section provide upstanding edges 22 and 23 which terminate immediately below the side edges of the dispensing opening 15 formed in the hopper bottom 14.

Figure 5:
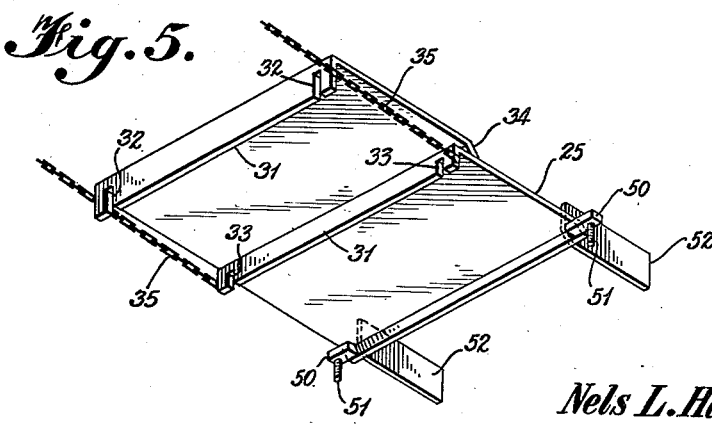
Figure 5 is a detailed perspective view showing the relationship of the closure plates of the instant invention.

A closure for the dispensing opening 15 is supported and guided on the upstanding edges 22 and 23 of rails 20 and 21. Such closure is formed by a series of overlapping plates 25, 26, 27, 28, 29 and 30. These plates bridge the space between the upstanding edges 22 and 23 and are of sufficient width as to extend slightly beyond the edges of the opening 15 so as to completely close such opening in the position shown in Figure 1. As clearly illustrated on Figures 1, 3 and 5, each of the closure plates has a downturned flange 31 along the inner end thereof with a pair of slots 32 and 33 formed in such flange adjacent the side edges of the plate. The upstanding edges 22 and 23 of the rails 20 and 21 engage in the slots 32 and 33, respectively, so that the plates are guided and firmly supported on the rails 20 and 21. The outer ends of each of the plates are provided with a downwardly curved lip 34 which engages, with the exception of plate 25, the upper surface of the immediately preceding closure plate. The lip 34 on plate 25 slidingly engages the upstanding edges 22 and 23 of rails 20 and 21.

In the position of closure plates 25 through 30 shown in Figure 1, the leading plate 25 is disposed with its outer end at the rear end of the dispensing opening 15. Each of the succeeding plates 26, 27, 28, 29 and 30 is positioned with its leading edge lip 34 resting on the upper surface of the immediately preceding plate. In the open position of the closure, as shown on Figure 3, the individual closure plates are nested beneath plate 30 so as to substantially completely overlie one another and thus insure maximum opening of dispensing opening 15.

In moving from opened to closed position, or vice versa, the respective closure plates slide longitudinally on the rails 20 and 21 under the guiding and supporting action of the slots 32 and 33 engaging upstanding edges 22 and 23. To limit the displacement possible between the various closure plates, flexible members 35 are secured to the outer edges of the downturned flanges 31. As shown on the drawings the flexible members 35 may constitute a chain. In the opened position of the closure the flexible members 35 hang loosely in free loops below the downturned flanges of the respective closure plates. As the plates are moved to close the dispensing opening 15 the slack in the flexible members 35 is taken up until in the final closed position the plates are disposed as shown in Figure 1 with members 35 extending taut between the respective downturned flanges of the closure plates.

Although as illustrated on the drawings the closure for the receptacle 13 has been shown as constituted of six separate closure plates, it will be readily recognized that this particular number of plates is only illustrative of the invention. In a practical embodiment it will be understood that many such closure plates may be employed to completely close the dispensing opening of a particular size receptacle. It is also to be understood that the relative lengths of the downturned flanges 31 on the respective closure plates have on the drawings been somewhat exaggerated to facilitate clearer illustration of the instant invention.

To effect opening and closing of the closure provided for the dispensing opening 15, a pair of closure operator belts or chains 40 and 41 are mounted outwardly of and parallel with the upstanding edges 22 and 23 of rails 20 and 21, respectively. These chains are threaded around sprockets 42 which in turn are keyed to a shaft 43. The shaft 43 is journaled in the rails 20 and 21 and carries at one of its outer ends a crank 44 to permit manual rotation of the shaft and thence rotation of sprockets 42 to drive the closure operator chains 40 and 41. The forward ends of the respective chains are threaded around idler sprockets 45 carried by brackets 46. The brackets 46 are slidably mounted on the outer faces of the rails 20 and 21 and may be moved longitudinally of the rails to tighten the respective chains 40 and 41 by adjustment of bolts 47.

The leading end of plate 25 is provided adjacent its outer edges with outwardly extending lugs 50. These lugs have studs 51 extending downwardly therefrom which serve to connect the lugs 50 to the respective closure operator chains 40 and 41. Additionally, the leading end of plate 25 carries a pair of guide fingers 52 which in the position of the plate on the rails 20 and 21 engage the inner faces of the upstanding edges 22 and 23 to assist in the alignment of the plate with the rails as it slides along such rails.

Figure 3:
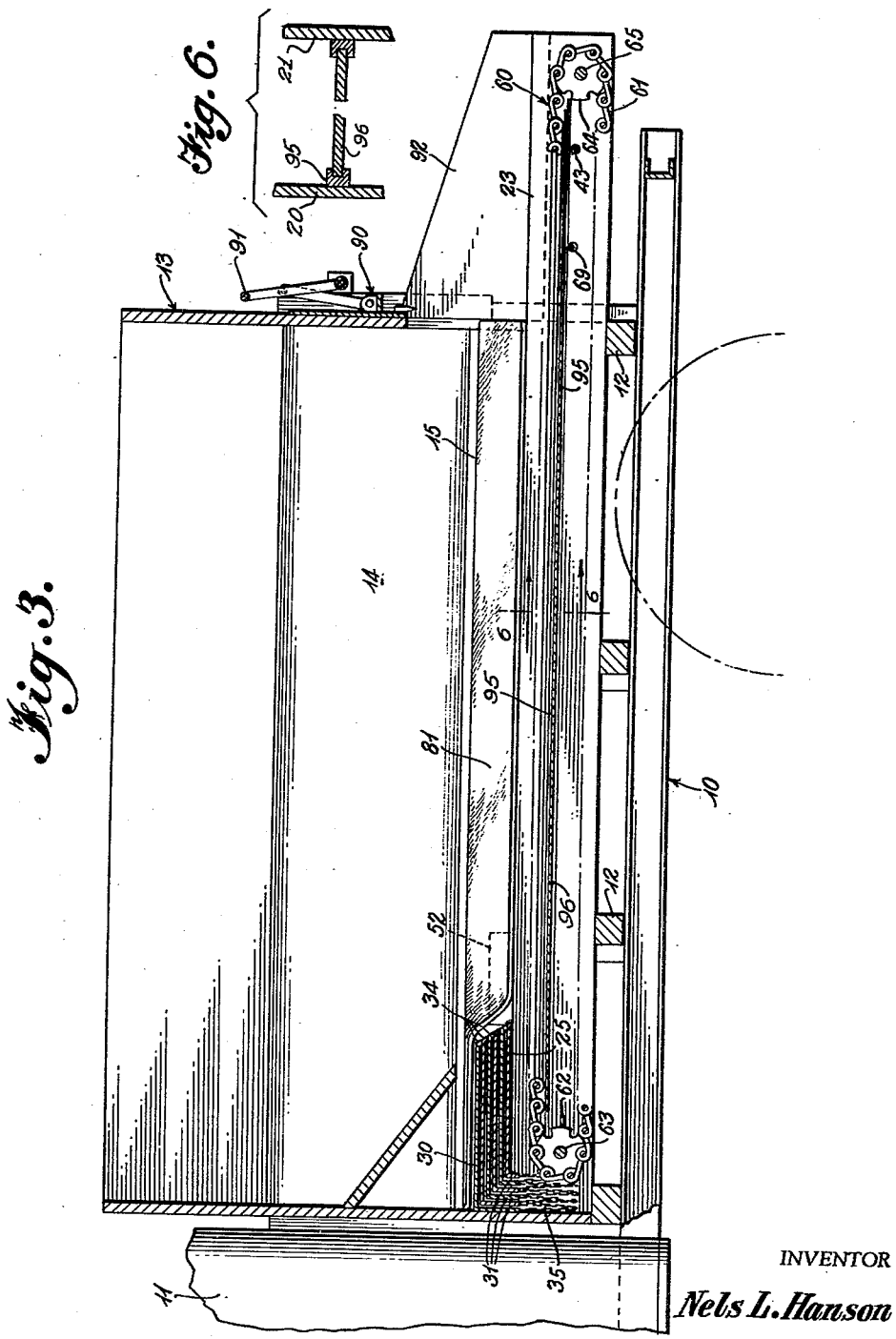
Figure 3 is a vertical sectional view taken on line 3—3 of Figure 2 with the closure plates retracted to open the dispensing opening.

From the structure as described hereinabove it will be apparent that manipulation of crank 44 to rotate shaft 43 and the sprockets 42 carried thereby will effect movement of the closure operator chains 40 and 41 to draw the closure plates 25 through 30 to their nested position as shown in Figure 3 or upon reverse rotation of shaft 43 to draw such plates to their positions as shown on Figure 1 closing the dispensing opening 15. It is again pointed out that the flexible members 35 serve to limit the extent of movement permissible between adjacent closure plates so that in their closed position such plates assume the positions as shown on Figure 1. To adjust the tension of closure operator chains 40 and 41 the respective chain tighteners constituted by a bracket 46 and a bolt 47 may be adjusted to move the idler sprockets 45 in the appropriate direction for tightening or loosening these chains.

Journaled in the rails 20 and 21 there is provided a conveyor 60. As illustrated on the drawings the conveyor is formed of a series of interconnected links providing a flexible belt 61 having transverse parallel rods forming the material conveying surface. Belt 61 is engaged over sprockets 62 mounted adjacent the forward end of the vehicle body on a shaft 63 journaled in the rails 20 and 21. The rearward end of the belt is engaged with driving sprockets 64 which in turn are keyed to a shaft 65 journaled in rails 20 and 21.

Although a specific type of conveyor has been shown, it will be recognized that other types of conveyors may be used in place of the conveyor illustrated. However, when a conveyor such as 61 is employed to unload grain or other particulate material, a plate 96 is positioned beneath the upper course of the conveyor belt in longitudinal guides 95 carried on the opposite inner faces of rails 20 and 21. With said plate 96 in place, grain falling onto said plate 96 through opening 15 will be carried rearwardly by the rods in the upper course of the conveyor 61 dragging said grain off of the plate. Said plate 96 is slid into the guides 95 by sliding it longitudinally in between the belt courses from the end of the conveyor.

The outer end of shaft 65 has a chain sprocket 66 keyed thereto which is drivingly coupled with a sprocket assembly 67 by means of a drive chain 68. Sprocket assembly 67 is rotatably supported on a stub shaft 69 and is driven through chain 70 from a sprocket assembly 71. Sprocket assembly 71 is freely rotatable relative to shaft 65 and is driven by a chain 72 connected through a sprocket and pulley assembly 73. The sprocket and pulley assembly 73 is rotatably supported on stub shaft 69 and is driven by a belt 74 connected with a pulley on an electrical motor 75. Thus it will be seen that upon energization of motor 75 the shaft 65 will be driven through the speed reducing sprocket and chain mechanism to effect movement of conveyor belt 61 and thus transport material dispensed from receptacle 13 rearwardly of the truck body upon opening of the closure for dispensing opening 15. The motor 75 is mounted on a suitable adjustable bracket 76 secured to and carried by the rear end of the vehicle body.

Although a specific form of motive power for conveyor 60, in the form of an electrical motor and a specific sprocket and chain speed reducer for coupling such motor to the conveyor, has been shown, it will be readily appreciated that within the scope of the instant invention other motive power for the conveyor may be supplied. Thus if desired the conveyor may be designed to be coupled to an external power source for driving such conveyor in the unloading operation.

The mounting of the closure plates on the upstanding edges 22 and 23 of rails 20 and 21 together with the downwardly curved leading edge or lip of the respective plates engaging the upper surface of the immediately preceding plate insures ease of operation of the closure without danger of clogging or binding of the closure by reason of the entrance of grain or other particulate material which may be carried within the receptacle. To further insure against seepage of such material into the operating mechanism of the dispensing opening closure, flexible strips 80 and 81 are secured along the edges of the opening 15 with a portion thereof overlying the side edges of the closure plates 25 through 30. These flexible strips, which may be formed of canvas, preclude seepage of material from the receptacle 13 laterally outwardly of the sides of plates 25 through 30. As shown in Figure 1, the flexible strips snugly engage over the sides of the closure plates when the closure is closed to effectively seal against seepage of material. Likewise, as shown in Figure 3, when the closure plates are moved to be nested in opening the dispensing opening, the flexible strips extend downwardly through the opening to assist in guiding the material onto the upper course of the conveyor belt 61.

The rear wall of receptacle 13 is provided with a suitable door or gate 90 which may be manually opened by manipulation of a handle 91 to provide an enlarged aperture for the unloading of material from receptacle 13 by operation of the conveyor 60. Further, to guide the material being unloaded by conveyor 60, plates 92 are secured to extend upwardly beyond the level of the upstanding edges 22 and 23 and extend rearwardly to channel the material being unloaded by conveyor 60. Thus the material as it is moved out of the receptacle 13 after opening the closure and upon operation of conveyor 60 will be carried rearwardly by the conveyor clear of the truck frame 10 to be discharged at the desired location.

The operation of the structure as described hereinabove will be apparent from the specific description as already given. However, it may here be pointed out that when the vehicle has been moved to the desired point to be unloaded, it is a simple matter to manipulate, through operation of crank 44, the closure operator chains 40 and 41 to move the closure plates into their nested position as shown in Figure 3, thus opening the dispensing opening 15. By this operation the material is discharged onto the conveyor belt 61, after which, operation of the conveyor can effect movement of the material rearwardly from the receptacle and discharge it off the end of the conveyor.

Having thus described my invention, what I claim is:

1. In a vehicle body forming a material receptacle having a dispensing opening along the bottom thereof and a pair of longitudinally extending supporting members beneath said opening, said supporting members being in a single plane, a closure for said opening having in combination, a series of members substantially rectangular in plan each having a depending flange at one end and each of said members with its other end overlapping the preceding member, flexible means maintaining said overlapping relation, said flanges being supported by said supporting members, and means for moving said members towards one end of said body into superposed relation to uncover said opening.

2. In a vehicle body forming a material receptacle having a dispensing opening along the bottom thereof and a pair of spaced parallel rails having upwardly extending portions forming supporting guides beneath said opening, said guides being disposed in a single plane, a closure for said opening having in combination, a series of members substantially rectangular in plan each having a depending flange at one end and each of said members overlapping the preceding member at its other end, flexible means maintaining said overlapping relation, said flanges supporting said first mentioned ends of said members and being supported by said guides, and means for moving said members into superposed relation to uncover said opening.

3. In a vehicle body forming a material receptacle having a dispensing opening along the bottom thereof and a pair of spaced parallel rails having upper edge portions forming supporting guides beneath said opening, a closure for said opening having in combination, a series of members substantially rectangular in plan respectively having depending flanges at one end thereof, said flanges respectively having transversely spaced notches in their bottom edge portions fitting over said guides, said members each overlapping the preceding member at its other end, flexible means connecting said members to maintain said overlapping relation, and means for moving said members towards one end of said body into superposed relation to uncover said opening.

4. In a vehicle body forming a material receptacle having a dispensing opening along the bottom thereof and a pair of spaced parallel rails having upper edge portions forming supporting guides beneath said openings, a closure for said opening having in combination, a series of plate members substantially rectangular in plan each having a depending flange at one end, said flanges each having transversely spaced notches in their lower edge portions fitting over said guides, said plate members each having downwardly inclined other end portions, said other end portions each overlapping the preceding plate member and being supported thereon except the other end portion of the first plate member which other end portion is supported on said guides, means connecting said plate members to maintain said overlapping relation, and means for moving said plate members towards one end of said vehicle body into superposed relation to uncover said opening.

5. The structure set forth in claim 4, said first mentioned means comprising a chain connecting adjacent of said plate members along either side thereof and adapted to maintain said overlapping relation.

6. In a vehicle body forming a material receptacle having a dispensing opening along the bottom thereof and a pair of longitudinally extending supporting members beneath said openings, a closure for said opening having in combination, a series of plate members each having a depending portion at one end supported by said supporting members, said plate members each having downwardly inclined other end portions respectively overlapping the preceding plate member and being supported thereon except for the first plate member the front end portion of which is supported on said supporting member, a pair of flexible members along either side of said plate members having portions thereof connected to said plate members to maintain said overlapping relation, and means connected to said first plate member for movement of said first plate member and said other plate members of engagement of said flange portion to move said plate members into superposed relation at one end of said vehicle body to uncover said opening.

7. A vehicle body having in combination, a material receptacle having a dispensing opening along the bottom thereof, and endless conveyor mounted beneath said opening, means for moving said conveyor, a plate member underlying said opening and disposed beneath the top run of said top conveyor having its upper surface engaged by said top run, and means for supporting said plate member whereby said conveyor will move material along said plate member.

8. A vehicle body having in combination, a material receptacle having a dispensing opening along the bottom thereof, and endless conveyor mounted beneath said opening, means for moving said conveyor, a plate member underlying said opening and positioned between the runs of said conveyor to have its surface engaged by the top run of said conveyor and a pair of members mounted adjacent either side of said conveyor for supporting said plate member whereby said conveyor will move along the upper surface of said plate member in contact therewith.

References Cited in the file of this patent

UNITED STATES PATENTS

| | | |
|---|---|---|
| 790,650 | McCarthy | May 23, 1905 |
| 1,014,768 | Meissner | Jan. 16, 1912 |
| 1,122,273 | Hansen | Dec. 29, 1914 |
| 2,783,901 | Komuchar et al. | Mar. 5, 1957 |